US012141844B2

(12) United States Patent
Shankman

(10) Patent No.: US 12,141,844 B2
(45) Date of Patent: Nov. 12, 2024

(54) WEB-BASED ADVERTISING MANAGEMENT SYSTEM AND WEB-BASED ADVERTISING MANAGEMENT PROCESS

(71) Applicant: HASHTAG LABS INC., Westport, CT (US)

(72) Inventor: John Shankman, Westport, CT (US)

(73) Assignee: HASHTAG LABS INC., Westport, CT (US)

( * ) Notice: Subject to any disclaimer, the term of this patent is extended or adjusted under 35 U.S.C. 154(b) by 0 days.

(21) Appl. No.: 17/881,129

(22) Filed: Aug. 4, 2022

(65) Prior Publication Data

US 2023/0041679 A1 Feb. 9, 2023

Related U.S. Application Data

(60) Provisional application No. 63/229,146, filed on Aug. 4, 2021.

(51) Int. Cl.
*G06Q 30/0241* (2023.01)
(52) U.S. Cl.
CPC ..... *G06Q 30/0276* (2013.01); *G06Q 30/0277* (2013.01)
(58) Field of Classification Search
CPC ............. G06Q 30/0276; G06Q 30/0277
USPC ............. 705/14.72, 14.66; 709/218
See application file for complete search history.

(56) References Cited

U.S. PATENT DOCUMENTS

| | | | | |
|---|---|---|---|---|
| 2002/0169842 A1* | 11/2002 | Christensen | ............ | H04L 67/14 709/206 |
| 2003/0208569 A1* | 11/2003 | O'Brien | ................ | H04L 67/303 709/221 |
| 2005/0150944 A1* | 7/2005 | Melick | ................. | G06K 7/1095 235/375 |
| 2007/0113237 A1* | 5/2007 | Hickson | ................. | G06F 9/542 719/318 |
| 2007/0130014 A1* | 6/2007 | Altberg | ............. | G06Q 30/0276 705/14.69 |
| 2007/0200851 A1* | 8/2007 | Said | ....................... | G06T 11/206 345/440 |
| 2008/0126515 A1* | 5/2008 | Chambers | .............. | G06Q 30/02 709/218 |

(Continued)

OTHER PUBLICATIONS

Trademark Electronic Search System (TESS), Javascript, Aug. 29, 2023, United States Patent and Trademark Office (Year: 2023).*

(Continued)

*Primary Examiner* — Tarek Elchanti
(74) *Attorney, Agent, or Firm* — BakerHostetler

(57) ABSTRACT

A device includes providing advertisement configuration options, receiving selected advertisement configuration options, receiving instructions to save and build an advertisement revision from the user device based on the selected advertisement configuration options, compiling and generating an unique advertisement configuration Javascript file based on the selected advertisement configuration options, storing the unique advertisement configuration Javascript file at a web service provider in response to the at least one processor, and deploying the unique advertisement configuration Javascript file in response to the at least one processor for a webpage without a need to modify an unique advertisement code on a webpage.

18 Claims, 14 Drawing Sheets

(56) References Cited

U.S. PATENT DOCUMENTS

| | | | | |
|---|---|---|---|---|
| 2008/0141218 A1* | 6/2008 | Chinnici | ................ | G06F 9/445 717/115 |
| 2008/0301280 A1* | 12/2008 | Chasen | ................... | H04L 67/02 709/224 |
| 2014/0156416 A1* | 6/2014 | Goenka | .............. | G06Q 30/0276 705/14.66 |

OTHER PUBLICATIONS

Appvales, Custom Ad Managementsoftware Development Forfacebook Ads Automation, 2021 (Year: 2021).*

* cited by examiner

Kale.life

History

| Revision | Note | Created | Last Modified By | Is Test Parent | Deployment | Status | Copy |
|---|---|---|---|---|---|---|---|
| 71 | remove ID5 | 2020-12-10 09:17 | luis@hashtag-labs.com | | | success | Copy Revision |
| 70 | Add ID5 UserID module | 2020-12-10 08:57 | luis@hashtag-labs.com | | Copy | success | Copy Revision |
| 69 | Finishes migration of 'article' layout to universal classes. | 2020-11-06 11:59 | patrick@hashtag-labs.com | | Copy | success | Copy Revision |
| 68 | Migrate remainder of 'homepage' layout ads to universal classes | 2020-11-05 15:09 | patrick@hashtag-labs.com | | Deploy | success | Copy Revision |

FIG. 13

WEB-BASED ADVERTISING MANAGEMENT SYSTEM AND WEB-BASED ADVERTISING MANAGEMENT PROCESS

CROSS-REFERENCE TO RELATED APPLICATIONS

This application claims the benefit from U.S. Provisional Application No. 63/229,146 filed on Aug. 4, 2021, which is hereby incorporated by reference in its entirety for all purposes as if fully set forth herein.

BACKGROUND OF THE DISCLOSURE

Website advertising typically includes promotion of goods, services, and/or the like and are a significant advertising tool for retailers, manufacturers, and/or others. Accordingly, advertisement publishers may purchase advertisement slots on webpages in which advertisements are to be shown.

Additionally, advertisement publishers typically desire a great number of different websites, webpages, and/or the like for advertisements as well as a number of different types of advertisements across different websites and/or webpages. In particular, the advertisement publishers desire to run their ads across many different websites. Similarly, website publishers who run ads from advertisement publishers desire to run ads from many different advertisement publishers. However, for website publishers managing the site configuration, deployment, and/or the like and any changes to the configuration and deployment to run ads from many different advertisement publishers requires code modifications, which may entail a substantially time-consuming process, which results in increased costs and reduced profits for website publishers, and/or the like.

Accordingly, what is needed is an advertisement management system and/or advertisement process to configure and deploy a wide variety of advertisement technologies across a website publisher in an expedited and/or simplified manner without the need to modify code on the webpage.

SUMMARY OF THE DISCLOSURE

One aspect includes an advertisement management process that includes: providing a user interface with at least one processor to a user device configured to allow a user to configure and deploy a plurality of advertisement technologies across their website by generating an advertisement configuration Javascript file without a need to modify the advertisement code on the website publisher pages. The unique advertisement code loads a library associated with the advertisement configuration Javascript file; where the unique advertisement code calls the advertisement configuration Javascript file; and where the unique advertisement code adds site key-value targeting associated with the advertisement configuration Javascript file.

One aspect includes an advertisement management process that includes: providing advertisement configuration options with at least one processor for display in a user interface on a user device; receiving selected advertisement configuration options with the at least one processor from the user device; receiving instructions to save and build an advertisement revision with the at least one processor from the user device based on the selected advertisement configuration options; compiling and generating a unique advertisement configuration Javascript file with the at least one processor based on the selected advertisement configuration options; storing the unique advertisement configuration Javascript file at a web service provider in response to the at least one processor; and deploying the unique advertisement configuration Javascript file in response to the at least one processor for a webpage without a need to modify a unique advertisement code on a webpage.

One aspect includes an advertisement management system that includes: at least one processor configured to provide a user interface to a user device configured to allow a user to configure and deploy a plurality of advertisement technologies across a plurality of websites by generating an advertisement configuration Javascript file without a need to modify a unique advertisement code on the plurality of websites, where the unique advertisement code is implemented by the plurality of websites; where the unique advertisement code loads a library associated with the advertisement configuration Javascript file; where the unique advertisement code calls the advertisement configuration Javascript file; and where the unique advertisement code adds site key-value targeting associated with the advertisement configuration Javascript file.

One aspect includes An advertisement management system that includes: at least one processor configured to provide advertisement configuration options for display in a user interface on a user device; the least one processor configured to receive selected advertisement configuration options from the user device; the least one processor configured to receive instructions to save and build an advertisement revision from the user device based on the selected advertisement configuration options; the least one processor configured to compile and generate a unique advertisement configuration Javascript file based on the selected advertisement configuration options; the least one processor configured to store the unique advertisement configuration Javascript file at a web service provider in response to the at least one processor; and the least one processor configured to deploy the unique advertisement configuration Javascript file in response to the at least one processor for a webpage without a need to modify a unique advertisement code on a webpage.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 13 illustrates a display rendering for data input according to the disclosure.

DETAILED DESCRIPTION OF THE DISCLOSURE

Figure 1:
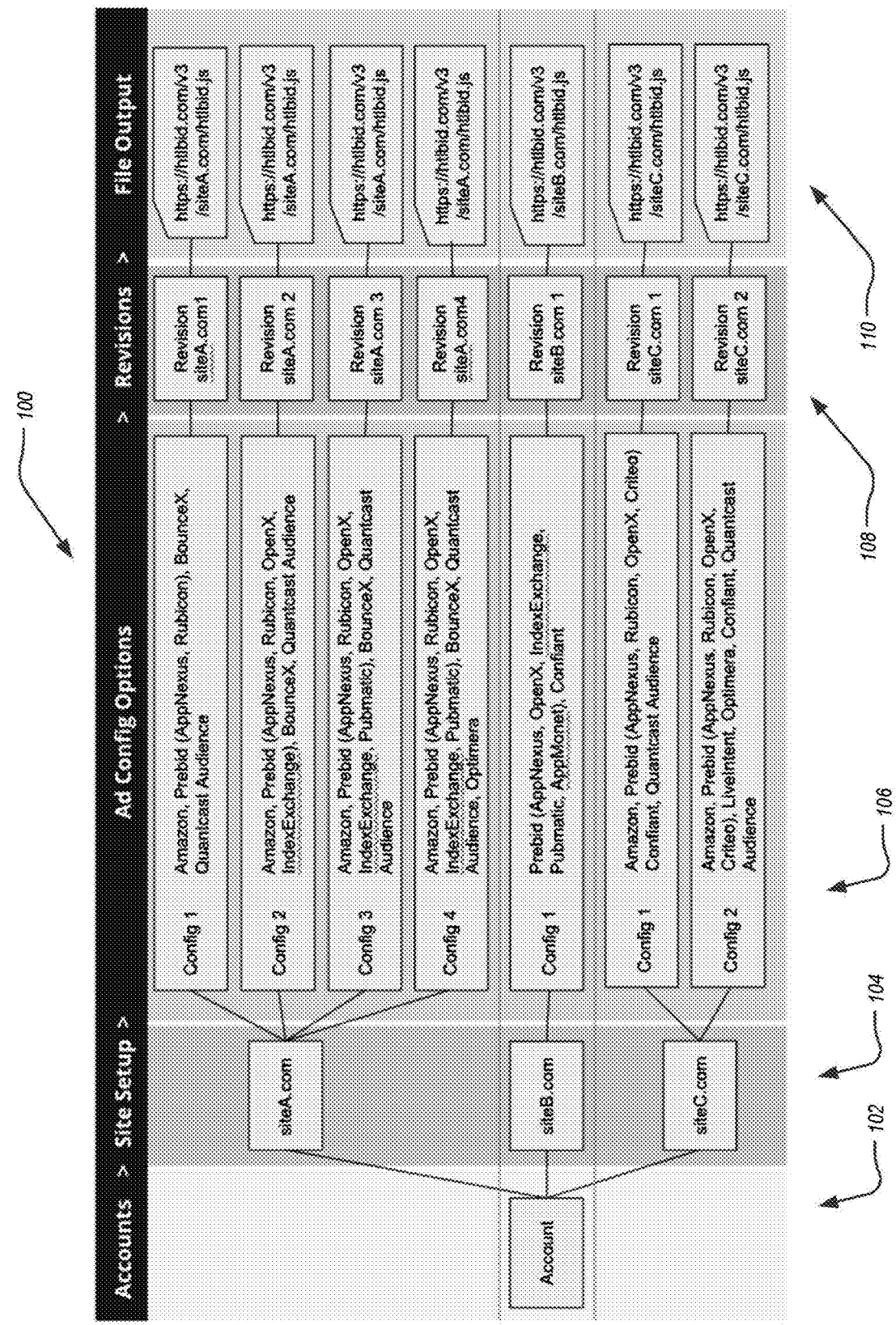
FIG. 1 is a chart that illustrates an exemplary build process for obtaining a final output file according to the disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

The advertisement system and/or advertisement process of the disclosure may be configured to allow users to configure and deploy a wide variety of advertisement technologies across many different websites through the same user interface. Moreover, the advertisement system and/or advertisement process of the disclosure may be configured to allow users to manage the site configuration and deploy any changes in a simplified and expedited manner. In particular, the advertisement system and/or advertisement process of the disclosure may be configured to allow users to manage the site configuration and deploy any changes without the need to modify code on the webpage. For example, the advertisement system and/or advertisement process of the disclosure may be configured to allow users to manage the site configuration and deploy any changes with the click of a button, without the need to modify code on the page. In contrast, current systems require advertisement publishers to modify the code on each webpage to implement site configuration, deploy any changes, and/or the like.

The advertisement system and/or advertisement process of the disclosure may be configured to be structured into accounts. In certain aspects, an account may be associated with a customer. Each account can have multiple websites, and each website can have different advertisement technology configurations.

The advertisement system and/or advertisement process of the disclosure may be configured to utilize a website advertisement technology configuration also known as "Revision" or a configuration revision. The advertisement system and/or advertisement process of the disclosure may be configured to compile the website advertisement technology configuration into individual advertisement configuration Javascript files that can be deployed to production sites, staging sites, and/or the like for that particular customer site.

The advertisement system and/or advertisement process of the disclosure may be configured to add a unique code or unique advertisement code to the webpage during the initial onboarding, any advertisement technology configuration changes can be implemented through a user interface implemented by the advertisement system and/or advertisement process of the disclosure instead of changing the unique advertisement code on the webpage. In particular, the ability to manage and change the advertising technology configuration for a particular site or sites through the user interface as described herein is very beneficial in that it reduces complexity, increases efficiency, and/or the like.

FIG. 1 is a chart that illustrates an exemplary build process for obtaining a final output file according to the disclosure.

In particular, FIG. 1 illustrates a build process 100 that may include account processes 102, site set up processes 104, advertisement configuration option processes 106, revision processes 108, and file output processes 110.

Accounts

The advertisement system and/or advertisement process of the disclosure may provide accounts for interaction and control of advertising. In particular, the advertisement system and/or advertisement process of the disclosure may implement the account processes 102.

In one or more aspects, the advertisement system and/or advertisement process of the disclosure implementing the account processes 102 may be configured to interact with enterprise clients. In particular, the advertisement system and/or advertisement process of the disclosure implementing the account processes 102 may be configured to provide log in functionality for enterprise clients to access their account. More specifically, clients may manage by the advertisement system and/or advertisement process of the disclosure their account in association with the account processes 102. The account implemented by the advertisement system and/or advertisement process of the disclosure can have multiple sites. Moreover, each account can create and manage user access through the advertisement system and/or advertisement process of the disclosure through implementation of the account processes 102. Additionally, the account processes 102 may include a number of additional processes.

The advertisement system and/or advertisement process of the disclosure may provide site setup. In particular, the advertisement system and/or advertisement process of the disclosure may implement the site set up processes 104.

In certain aspects, each site may have to be configured individually in association with the site set up processes 104. The configuration may have some required information (*) and optional information that each client may need to provide as part of the site set up processes 104. Thereafter, once the configuration options and/or information are completed as part of the site set up processes 104, then the advertisement system and/or advertisement process of the disclosure implementing the file output processes 110 may compile all of the related code to each of a number of advertisement related services; and the advertisement system and/or advertisement process of the disclosure implementing the site set up processes 104 may serve one complete file that includes all of these individual advertisement related services.

Advertisement Configuration Options

The advertisement system and/or advertisement process of the disclosure may provide many advertisement technology configurations available for sites utilizing the advertisement configuration option processes 106. Some of the configuration options may require account IDs unique to each site. In some cases, clients will have these IDs from and/or will request them through their own accounts, and others may use accounts implemented by the advertisement system and/or advertisement process of the disclosure. In particular, the advertisement system and/or advertisement process of the disclosure can request IDs unique for the sites. The setup process may be the same in both cases, the difference may come down to the ownership of the account where the IDs come from. Marked in the following list are options that require unique IDs or code from the site/client if they want to use it (**):

Header Bidding: Amazon, Prebid, Prebid Server**, Prebid Currency, and Prebid Supply Chain.

Analytics: Roxot and Sovrn Analytics.

Identity: LiveRamp, The Trade Desk, and Criteo LiveIntent ID5**.

Third Party Services: Optimera, Confiant, Blockthrough, BounceX, and ONECount.

Other Ads and Site Configuration: Custom Javascript, Custom CS, Passbacks, and Backfill.

The advertisement system and/or advertisement process of the disclosure may provide various configurations. Some configuration examples are illustrated in FIG. 8, FIG. 9, FIG. 10, FIG. 11, and FIG. 12 and may include classes, templates, and/or the like.

Building Revisions and Version Control

The advertisement system and/or advertisement process of the disclosure may be configured for Building Revisions and Version Control. Once the configuration options are selected in conjunction with the advertisement configuration option processes 106, users may "Save and Build" a new Revision in conjunction with the revision processes 108. The file output processes 110 may include compiling the specific Site configurations selected in the user interface related to the advertisement configuration option processes 106. The compilation may result in a unique advertisement configuration Javascript file. In particular, the unique advertisement configuration Javascript file may be stored by a web service provider such as Amazon Web Services (AWS). The unique advertisement configuration Javascript file may include a unique sequential Site Revision identification (ID), a unique Version identification (ID), and/or other types of identification.

The revision processes 108 may include generating and saving a new advertisement configuration Javascript file for each revision. Since each Revision creates a new advertisement configuration Javascript file that is saved and not overwritten, the revision processes 108 provide users an easy way to manage version control. In conjunction with the revision processes 108, users have the option to deploy a new version or re-deploy previous Revisions with different configurations at any time, and/or the like. This functionality may be helpful in situations where an incorrect Revision is deployed to production.

The advertisement system and/or advertisement process of the disclosure may be configured such that a build process can be seen in the log available to users. In the same screen as the log, users can access the Implementation Instructions and Example pages specific for the Site. The Implementation Instructions may provide users with the unique advertisement code they need to add to their Sites. Once added following the instructions, the customized advertisement configuration Javascript file they created with the Revision can be deployed to the webpage.

The unique advertisement configuration Javascript file generated by the advertisement system and/or advertisement process of the disclosure may include a script tag specific to the site that may load the "unique advertisement configuration Javascript file" library on the page and a second part that calls the unique advertisement configuration Javascript file and adds any site key-value targeting.

The advertisement system and/or advertisement process of the disclosure may include multiple deployment options including Production and Staging. The advertisement system and/or advertisement process of the disclosure may automatically create a second stage-specific advertisement configuration Javascript file for each Revision. The stage script may be similar to the production one and can be added to staging/test sites for users to test using "Stage-only" when clicking the Deploy button.

Javascript File and Site Review

The advertisement system and/or advertisement process of the disclosure may provide the advertisement configuration Javascript File and Site Review. In particular, once the advertisement system and/or advertisement process of the disclosure is configured in the user interface and the scripts added to the site HTML, the advertisement configuration Javascript file and/or the Revision compiles and can be found in the Network tab. Reviewing that file users can see the configuration settings they selected. When users deploy different Revisions from the user interface of the advertisement system and/or advertisement process of the disclosure, they will be loaded within a few minutes through the same library script already on the page.

Additionally, the advertisement system and/or advertisement process of the disclosure may generate the advertisement configuration Javascript file with built in functionalities that let users easily see specific Site configuration settings, such as Consent Management, specific advertisement slot configurations, Version ID, targeting, and/or the like.

Figure 2:
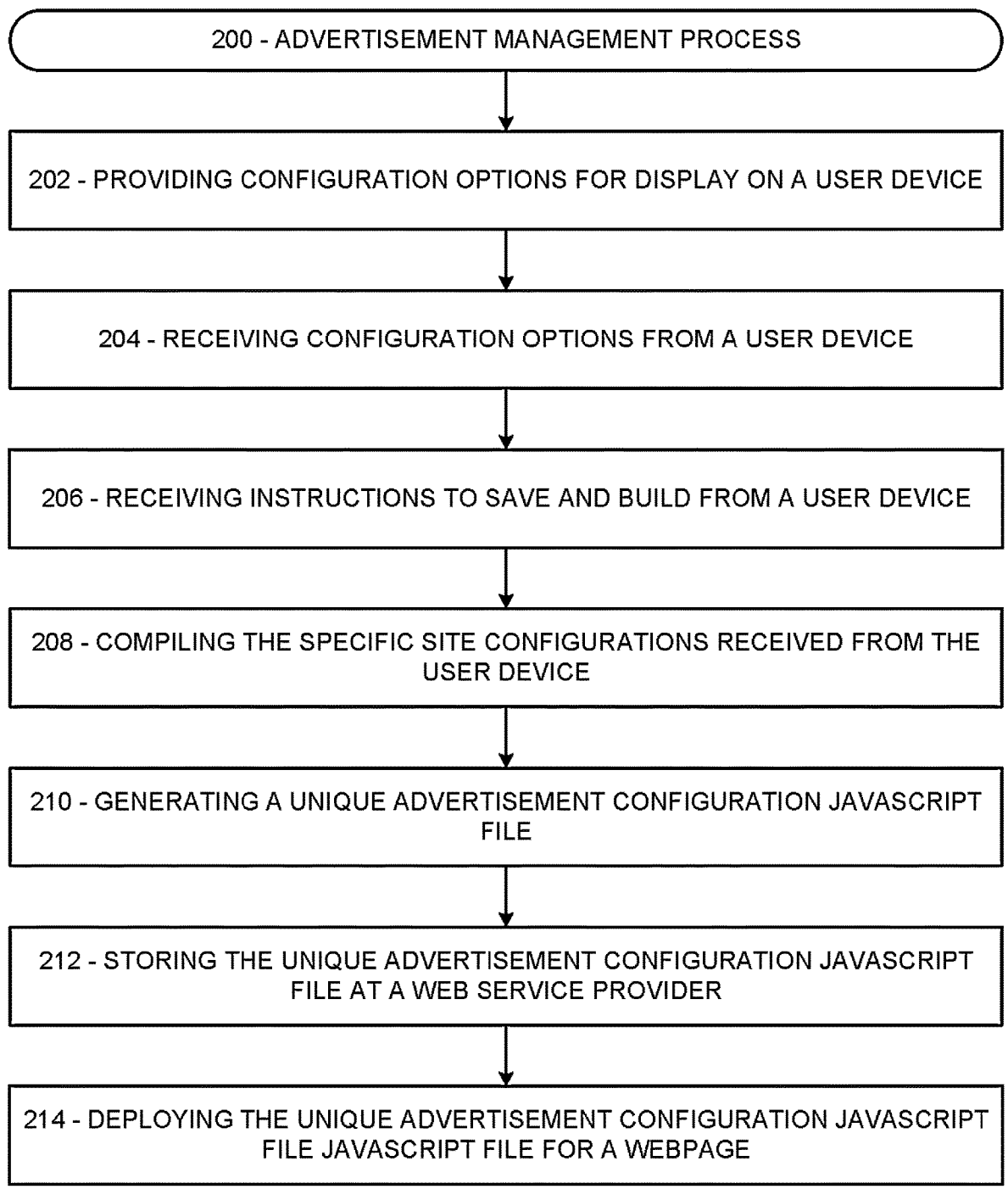
FIG. 2 illustrates an advertisement management process according to the disclosure.

FIG. 2 illustrates an advertisement management process according to the disclosure.

In particular, FIG. 2 illustrates an advertisement management process 200. It should be noted that the aspects of the advertisement management process 200 may be performed in a different order consistent with the aspects described herein. Moreover, the advertisement management process 200 may be modified to have more or fewer processes consistent with the various aspects disclosed herein.

The advertisement management process 200 may include providing configuration options for display on a user device 202. The advertisement management process 200 may include receiving configuration options from a user device 204. In particular, the receiving configuration options from a user device 204 may include receiving configuration options by the advertisement system 400 from the user device 300 as described herein.

The advertisement management process 200 may include receiving instructions to save and build from a user device 206. In particular, the receiving instructions to save and build from a user device 206 may include receiving instructions to save and build by the advertisement system 400 from the user device 300 as described herein.

The advertisement management process 200 may include compiling the specific site configurations received from the user device 208. In particular, compiling the specific site configurations received from the user device 208 may include compiling the specific site configurations received with the advertisement system 400 as described herein.

The advertisement management process 200 may include generating a unique advertisement configuration Javascript file 210. In particular, the generating a unique advertisement configuration Javascript file 210 may include generating a unique advertisement configuration Javascript file by the advertisement system 400 as described herein.

The advertisement management process 200 may include storing the unique advertisement configuration Javascript file at a web services provider 212. In particular, the storing the unique advertisement configuration Javascript file at a web services provider 212 may include storing the unique advertisement configuration Javascript file by the advertisement system 400 at a web services provider.

The advertisement management process 200 may include deploying a customized advertisement configuration Javascript file for a webpage 214. In aspects, the deploying a customized advertisement configuration Javascript file for a webpage 214 may include deploying a customized advertisement configuration Javascript file for a webpage by the advertisement system 400 as described herein.

In aspects, the advertisement management process 200 may include providing a user interface with at least one processor of the advertisement system 400 to the user device 300; and the advertisement system 400 may be configured to allow a user to configure and deploy a plurality of advertisement technologies across a plurality of websites by generating an advertisement configuration Javascript file without a need to modify a unique advertisement code on the plurality of websites. In aspects, the unique advertisement code may be implemented by the plurality of websites. In aspects, the unique advertisement code loads a library associated with the advertisement configuration Javascript file. In aspects, the unique advertisement code calls the advertisement configuration Javascript file. In aspects, the unique advertisement code may add site key-value targeting associated with the advertisement configuration Javascript file.

Figure 3:
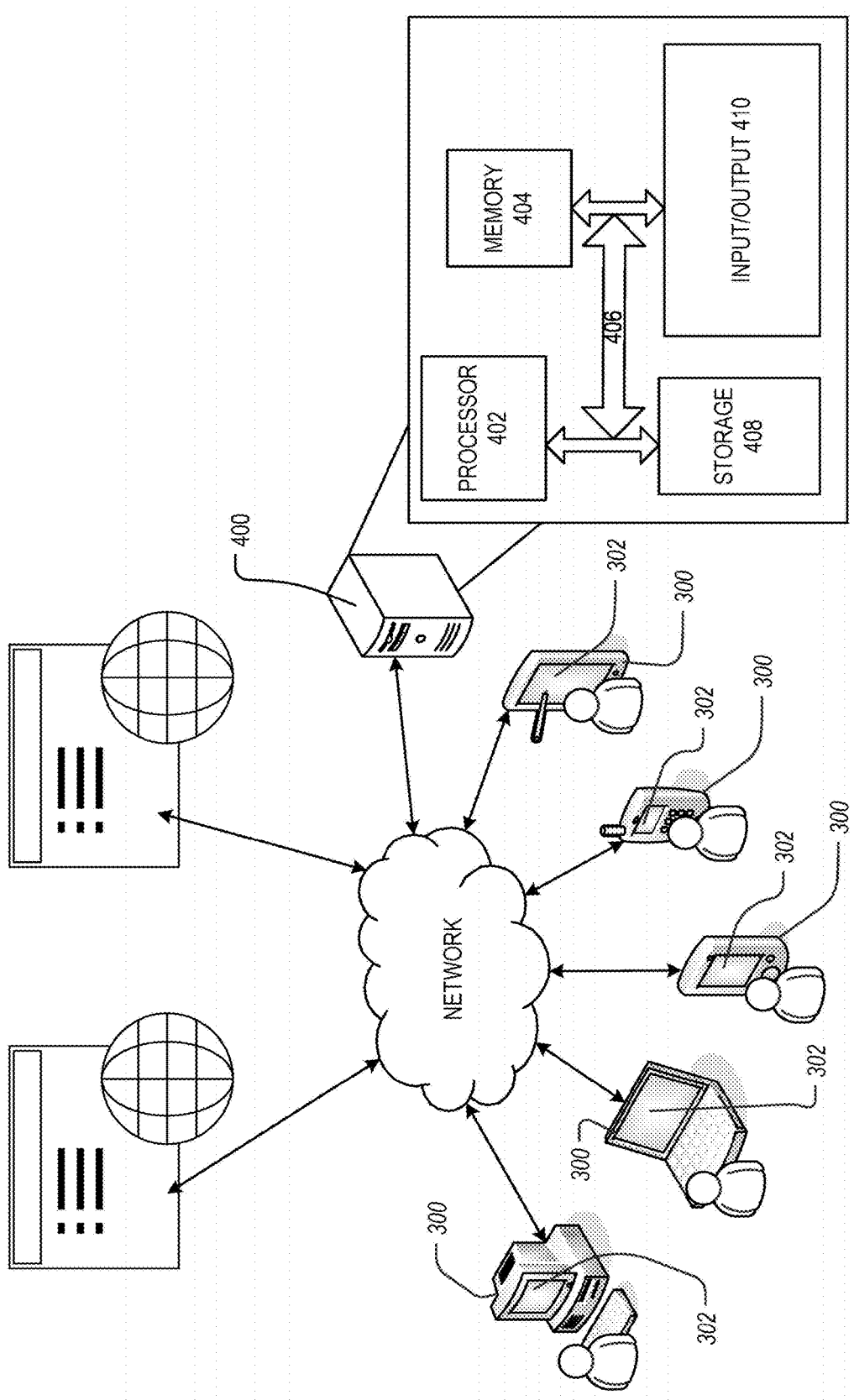
FIG. 3 illustrates an advertisement system according to the disclosure.

FIG. 3 illustrates an advertisement system according to the disclosure.

In particular, FIG. 3 illustrates an advertisement system 400 in accordance with an aspect of the disclosure. The advertisement system 400 illustrated in FIG. 3 may implement at least in part the advertisement management process 200. In particular aspects, the advertisement system 400 may include a processor 402, a memory 404, an input/output 410, a bus 406, and/or the like. In particular aspects, the advertisement system 400 may include generating data for display on the display 302 of a user device 300. In one aspect, the advertisement system 400 may include receiving input data from the user device 300. The advertisement system 400 may include a storage 408.

In one aspect, the advertisement system 400 may be implemented by a server. In one aspect, the advertisement system 400 may connect to the user device 300 over a network utilizing a communication channel as defined herein. In one aspect, the advertisement system 400 may be configured to implement a web tool, a website, a web portal, and/or the like.

In aspects, an advertisement management system may include at least one implementation of the processor 402 that may be configured to provide a user interface with a the advertisement system 400 to the user device 300; and the advertisement system 400 may be configured to allow a user to configure and deploy a plurality of advertisement technologies across a plurality of websites by generating an advertisement configuration Javascript file without a need to modify a unique advertisement code on the plurality of websites. In aspects, the unique advertisement code may be implemented by the plurality of websites. In aspects, the unique advertisement code loads a library associated with the advertisement configuration Javascript file. In aspects, the unique advertisement code calls the advertisement configuration Javascript file. In aspects, the unique advertisement code may add site key-value targeting associated with the advertisement configuration Javascript file.

In one aspect, the advertisement system 400 may be configured to provide advertisement configuration options for display in a user interface on the user device 300. The advertisement system 400 may be configured to receive selected advertisement configuration options from the user device 300. The advertisement system 400 may be configured to receive instructions to save and build an advertisement revision from the user device 300 based on the selected advertisement configuration options. The advertisement system 400 may be configured to compile and generate a unique advertisement configuration Javascript file based on the selected advertisement configuration options. The advertisement system 400 may be configured to store the unique advertisement configuration Javascript file at a web service provider in response to the at least one processor. The advertisement system 400 may be configured to deploy the unique advertisement configuration Javascript file in response to the at least one processor for a webpage without a need to modify a unique advertisement code on a webpage.

Figure 4:
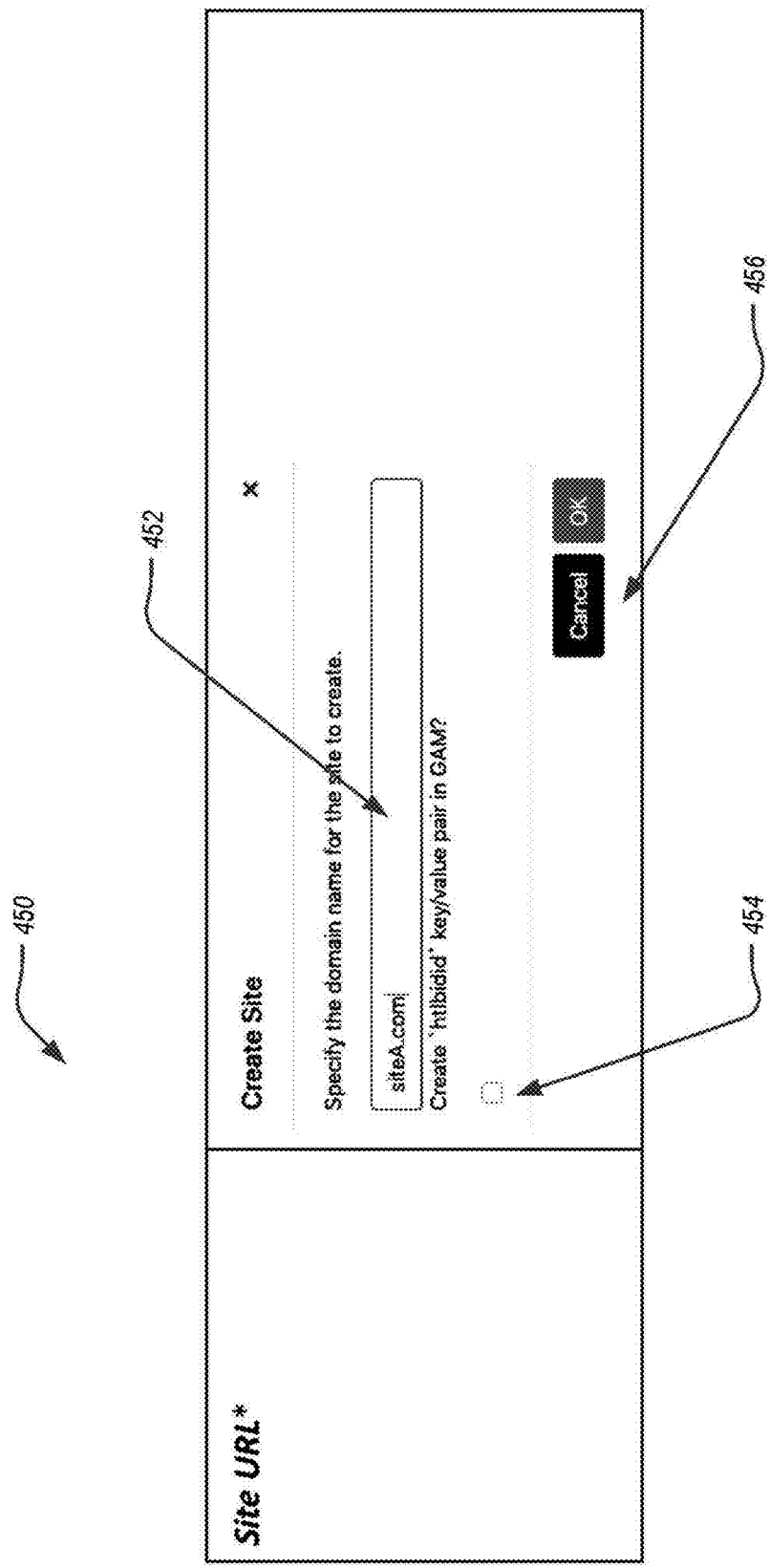
FIG. 4 illustrates a display rendering for data input according to the disclosure.

FIG. 4 illustrates a display rendering for data input according to the disclosure.

In particular, FIG. 4 illustrates a graphical user interface (GUI) 450 that may include an input portion 452, an input portion 454 and/or an input portion 456 for display on a display of the user device 300. With further reference to FIG. 4, the graphical user interface (GUI) 450 is merely exemplary of a possible layout, possible features, and/or the like. The disclosure contemplates that the graphical user interface (GUI) 450 may be implemented numerous other ways.

The input portion 452, the input portion 454, and/or input portion 456 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input.

In particular, the graphical user interface (GUI) 450 illustrated in FIG. 4 may be utilized to create a site. Moreover, the graphical user interface (GUI) 450 may allow users to specify the domain name for the site to create. In this regard, the input portion 452 may allow entry of a domain name in order to create the site. Additionally, the graphical user interface (GUI) 450 may allow a user to provide a key/value pair in Google Ad Manager (GAM) through the input portion 454. Once information has been input to the graphical user interface (GUI) 450, the user may select the input portion 456 to either cancel the input provided to the graphical user interface (GUI) 450 or submit the information to the user device 300 and/or the advertisement system 400.

Figure 5:
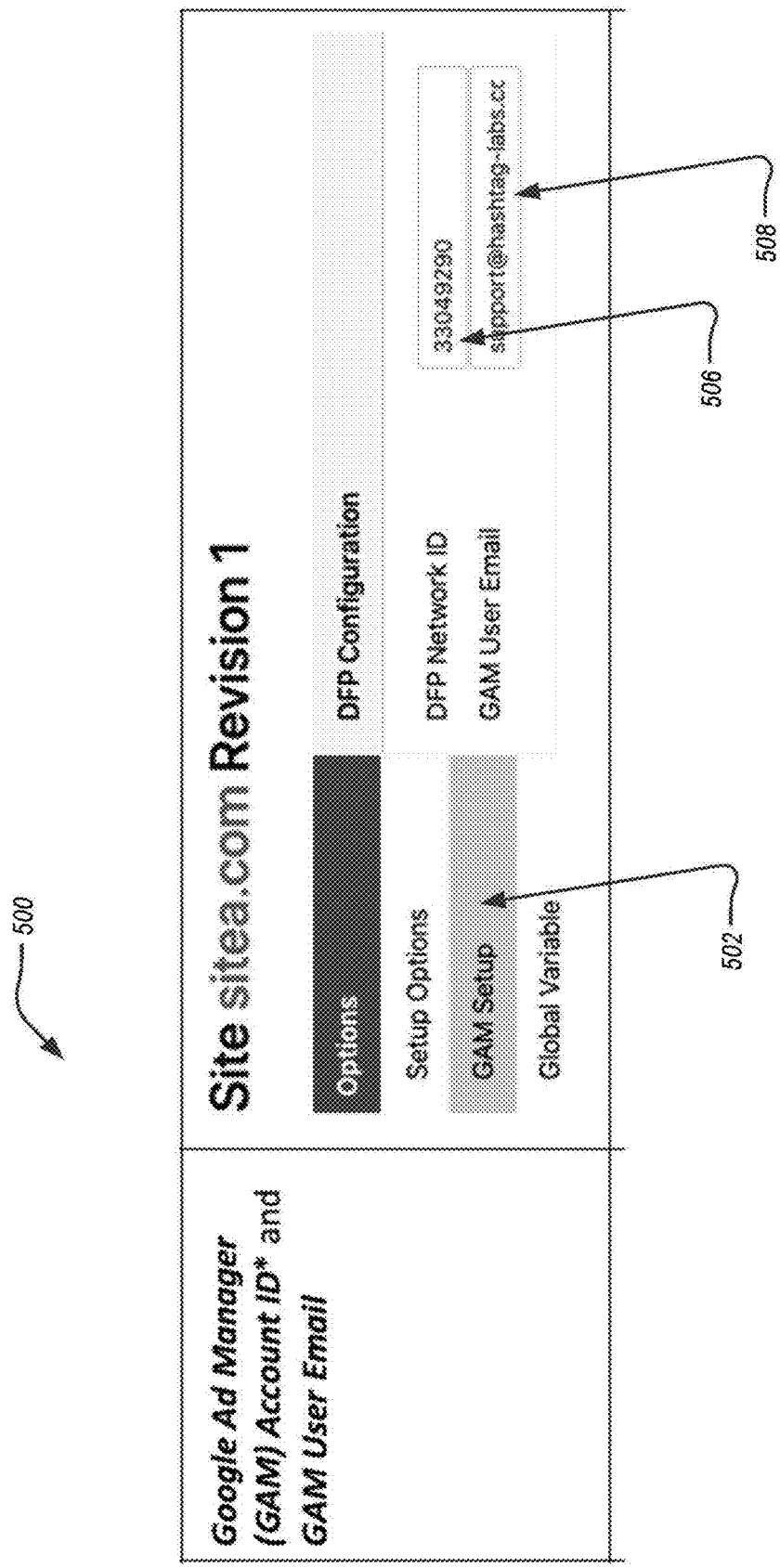
FIG. 5 illustrates a display rendering for data input according to the disclosure.

FIG. 5 illustrates a display rendering for data input according to the disclosure.

In particular, FIG. 5 illustrates a graphical user interface (GUI) 500 that may include an input portion 502, an input portion 506, and/or an input portion 508 for display on a display of the user device 300. With further reference to FIG. 5, the graphical user interface (GUI) 500 is merely exemplary of a possible layout, possible features, and/or the like. The disclosure contemplates that the graphical user interface (GUI) 500 may be implemented numerous other ways.

The input portion 502 and/or the input portion 506, may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input.

In particular, the graphical user interface (GUI) 500 illustrated in FIG. 5 may be utilized to input a Google Ad Manager (GAM) identification, input a Google Ad Manager (GAM) email, and/or the like. In this regard, the graphical user interface (GUI) 500 may provide selection of a Google Ad Manager (GAM) set up by manipulation of the input portion 502. Thereafter, the user may input their Double-Click for Publishers (DFP) network identification and/or their Google Ad Manager (GAM) identification in the input portion 506; and input their Google Ad Manager (GAM) user email in the input portion 508.

Figure 6:
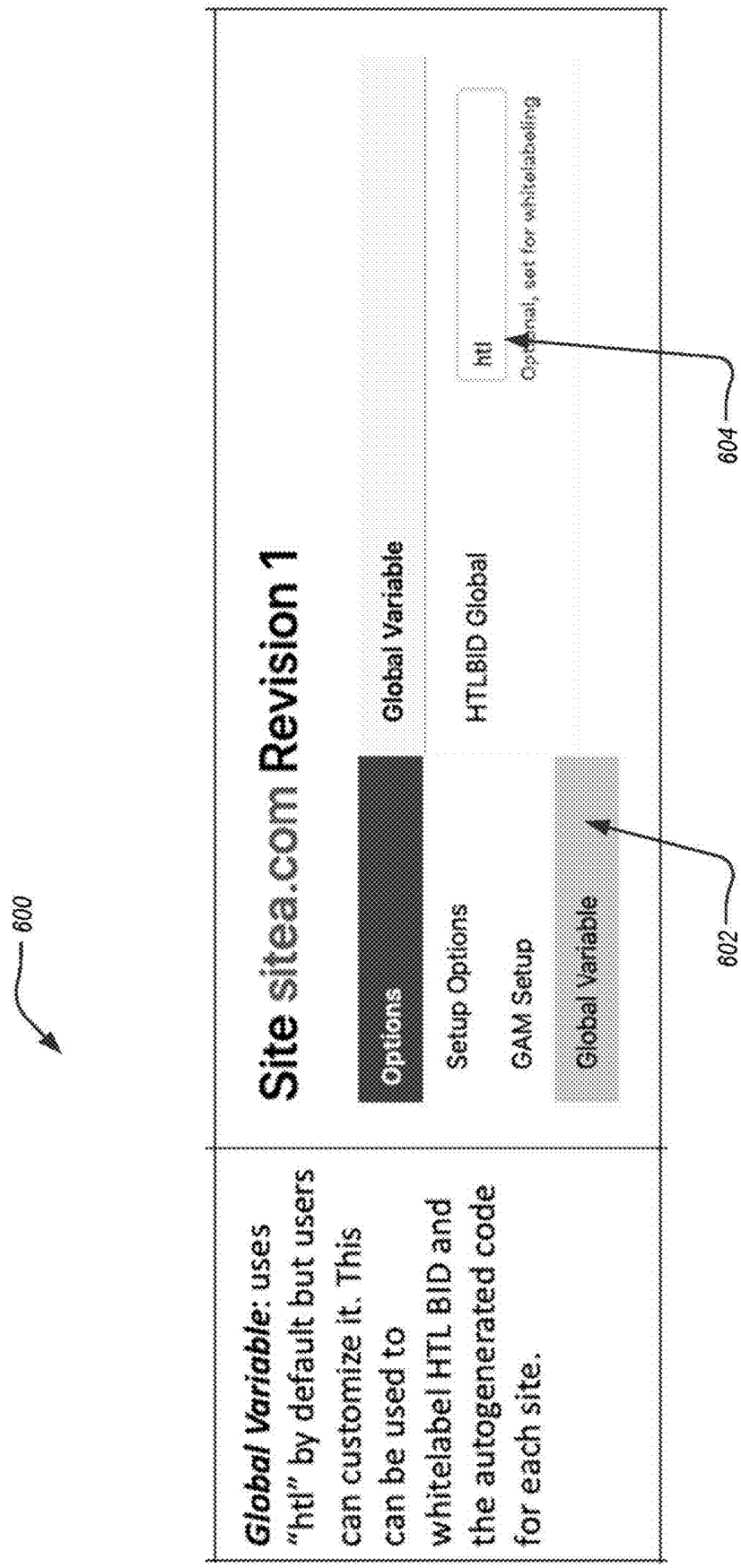
FIG. 6 illustrates a display rendering for data input according to the disclosure.

FIG. 6 illustrates a display rendering for data input according to the disclosure.

In particular, FIG. 6 illustrates a graphical user interface (GUI) 600 that may include an input portion 602 and/or an input portion 604 for display on a display of the user device 300. With further reference to FIG. 6, the graphical user interface (GUI) 600 is merely exemplary of a possible layout, possible features, and/or the like. The disclosure contemplates that the graphical user interface (GUI) 600 may be implemented numerous other ways.

The input portion 602 and/or the input portion 604 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input.

In particular, the input portion 602 may include an input portion to configure the input portion 602 for input of a global variable. Thereafter, the graphical user interface (GUI) 600 may provide the input portion 604. The input portion 604 may be configured to receive a global variable. The global variable may use a default value to white label aspects of the system and the associated code for each site.

Figure 7:
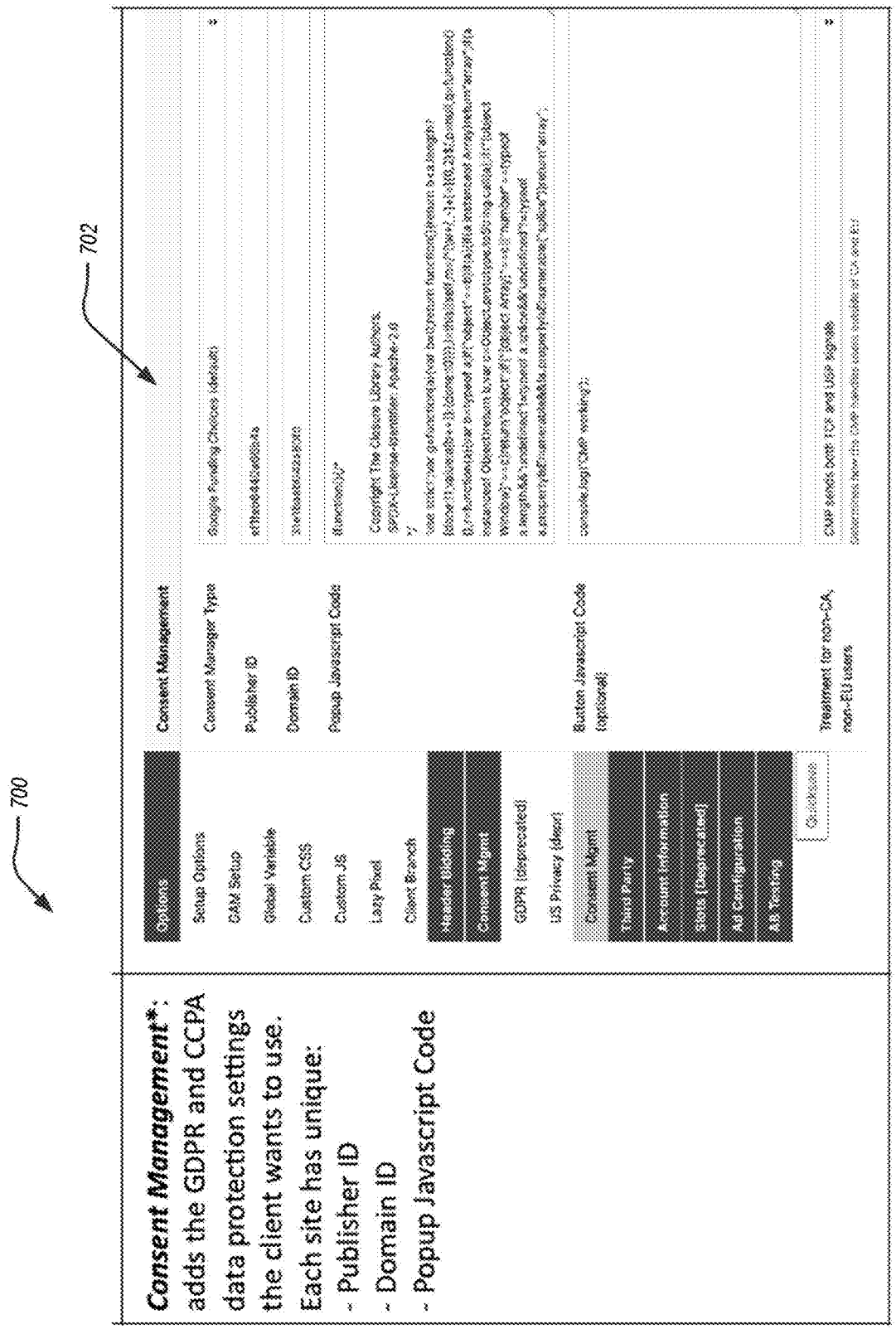
FIG. 7 illustrates a display rendering for data input according to the disclosure.

FIG. 7 illustrates a display rendering for data input according to the disclosure.

In particular, FIG. 7 illustrates a graphical user interface (GUI) 700 that may include an input portion 702 for display on a display of the user device 300. With further reference to FIG. 7, the graphical user interface (GUI) 700 is merely exemplary of a possible layout, possible features, and/or the like. The disclosure contemplates that the graphical user interface (GUI) 700 may be implemented numerous other ways.

The input portion 702 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input.

In particular, the input portion 702 may include a plurality of input portions including an input for consent manager type, publisher identification, domain identification, and/or the like. Additionally, the graphical user interface (GUI) 700 may display a pop-up JavaScript code, a button for JavaScript code, and/or the like. Additionally, aspects associated with the graphical user interface (GUI) 700 may include adding General Data Protection Regulation (GDPR) and California Consumer Privacy Act (CCPA) data protection settings. In particular, the graphical user interface (GUI) 700 is configured to provide Consent Management, which may add the GDPR and CCPA data protection settings the client wants to use. In this regard, each site may have its own unique Publisher ID, Domain ID, Popup Javascript Code, and/or the like.

Figure 8:
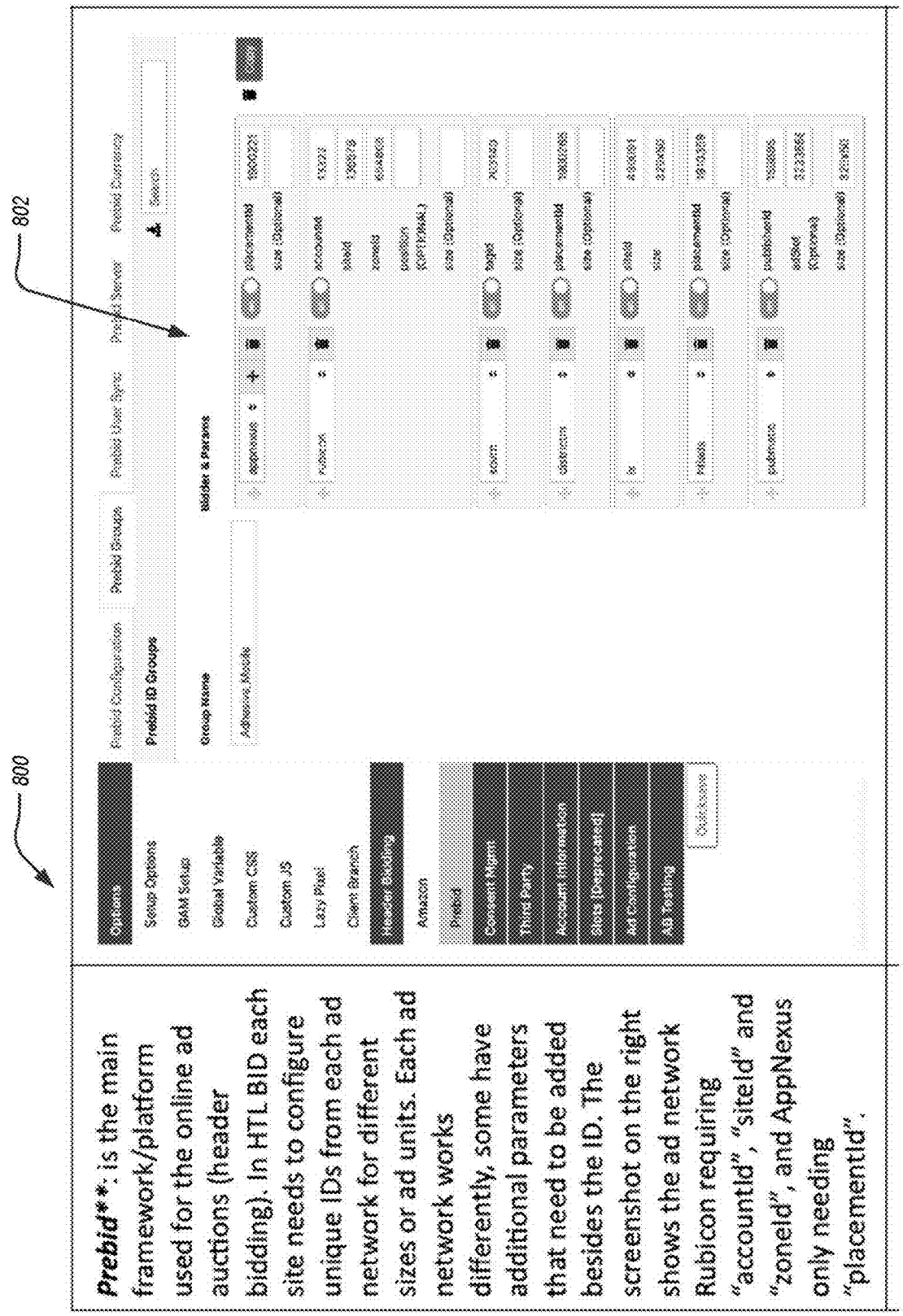
FIG. 8 illustrates a display rendering for data input according to the disclosure.

FIG. 8 illustrates a display rendering for data input according to the disclosure.

In particular, FIG. 8 illustrates a graphical user interface (GUI) 800 that may include an input portion 802 for display on a display of the user device 300. With further reference to FIG. 8, the graphical user interface (GUI) 800 is merely exemplary of a possible layout, possible features, and/or the like. The disclosure contemplates that the graphical user interface (GUI) 800 may be implemented numerous other ways.

The input portion 802 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input.

In particular, the input portion 802 provided by the graphical user interface (GUI) 800 may include a plurality of input portions including bidders and associated parameters. In this regard, the graphical user interface (GUI) 800 may be configured as a main framework/platform used for online ad auctions (header bidding). In aspects of the disclosure, each site needs to configure unique IDs from each ad network for different sizes or ad units. Each ad network may work differently, some may have additional parameters that need to be added besides the ID. The graphical user interface (GUI) 800 shows the ad network Rubicon requiring "accountId," "siteId," and "zoneId", and AppNexus only needing "placementId."

Figure 9:
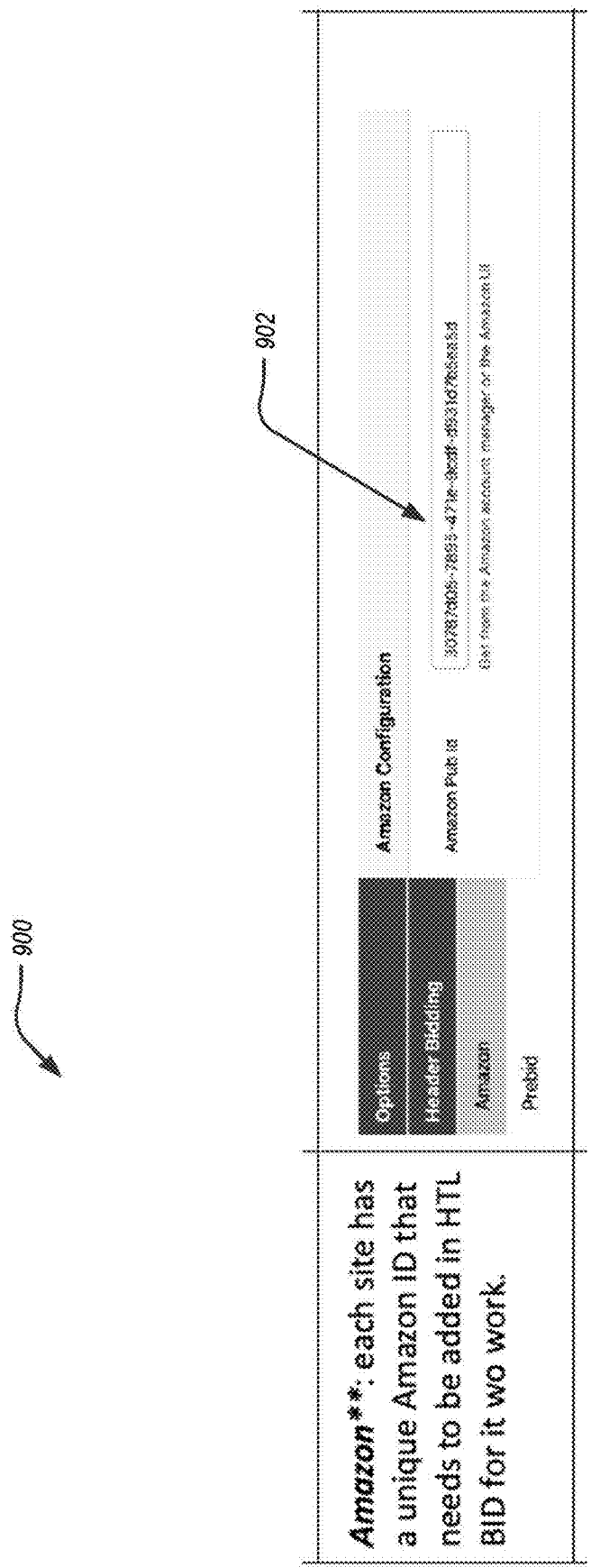
FIG. 9 illustrates a display rendering for data input according to the disclosure.

FIG. 9 illustrates a display rendering for data input according to the disclosure.

In particular, FIG. 9 illustrates a graphical user interface (GUI) 900 that may include an input portion 902 for display on a display of the user device 300. With further reference to FIG. 9, the graphical user interface (GUI) 900 is merely exemplary of a possible layout, possible features, and/or the like. The disclosure contemplates that the graphical user interface (GUI) 900 may be implemented numerous other ways.

The input portion 902 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input. In particular, the input portion 902 provided by the graphical user interface (GUI) 900 may allow for input for an Amazon configuration including an Amazon publication identification.

Figure 10:
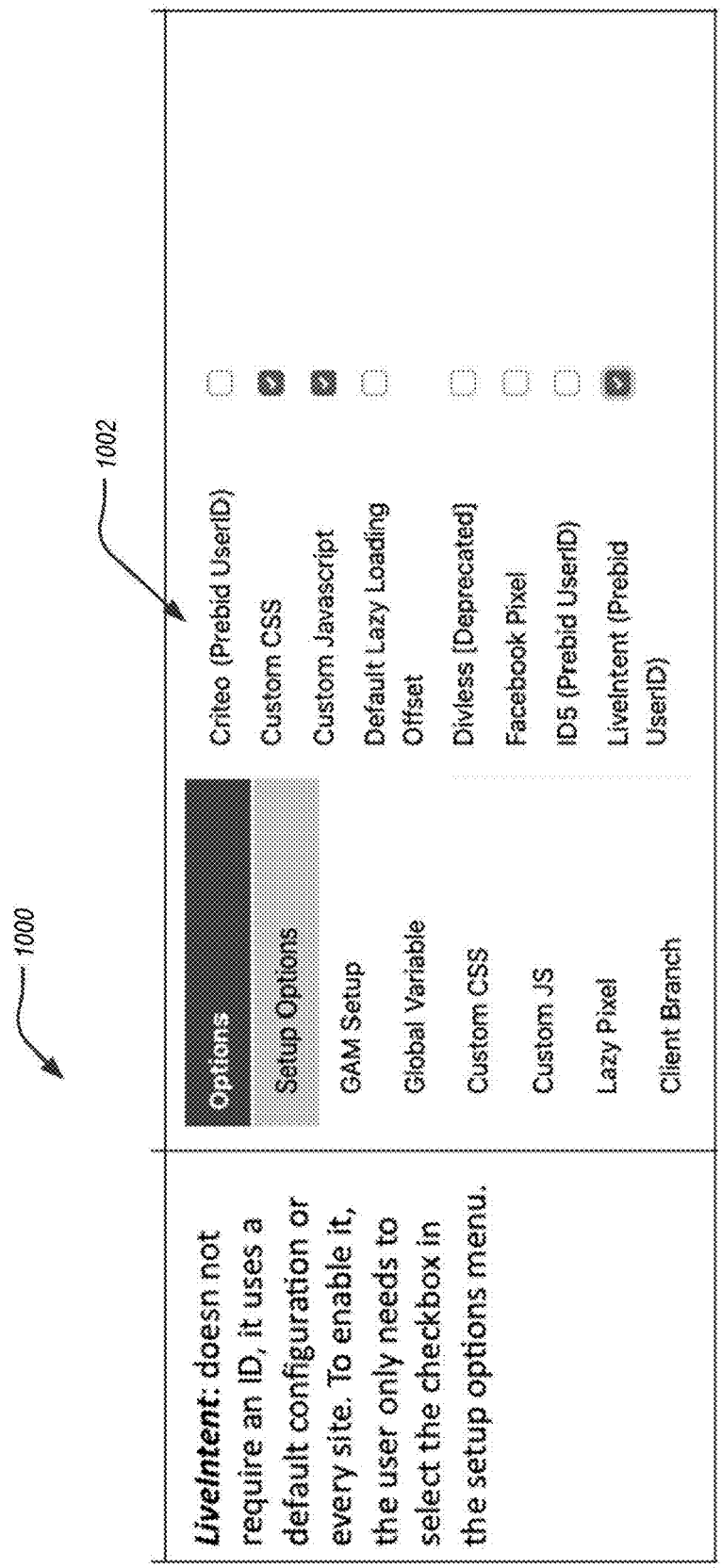
FIG. 10 illustrates a display rendering for data input according to the disclosure.

FIG. 10 illustrates a display rendering for data input according to the disclosure.

In particular, FIG. 10 illustrates a graphical user interface (GUI) 1000 that may include an input portion 1002 for display on a display of the user device 300. With further reference to FIG. 10, the graphical user interface (GUI) 1000 is merely exemplary of a possible layout, possible features, and/or the like. The disclosure contemplates that the graphical user interface (GUI) 1000 may be implemented numerous other ways.

The input portion 1002 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input. In particular, the input portion 1002 provided by the graphical user interface (GUI) 1000 may include features to enable or disable numerous functionality for set up of the disclosed system. The functionality may include Criteo (Prebid UserID), Custom CSS, Custom Javascript, Default Lazy Loading Offset, Divless [Deprecated], Facebook Pixel, IDS (Prebid UserID), LiveIntent (Prebid UserID), and/or the like.

Figure 11:
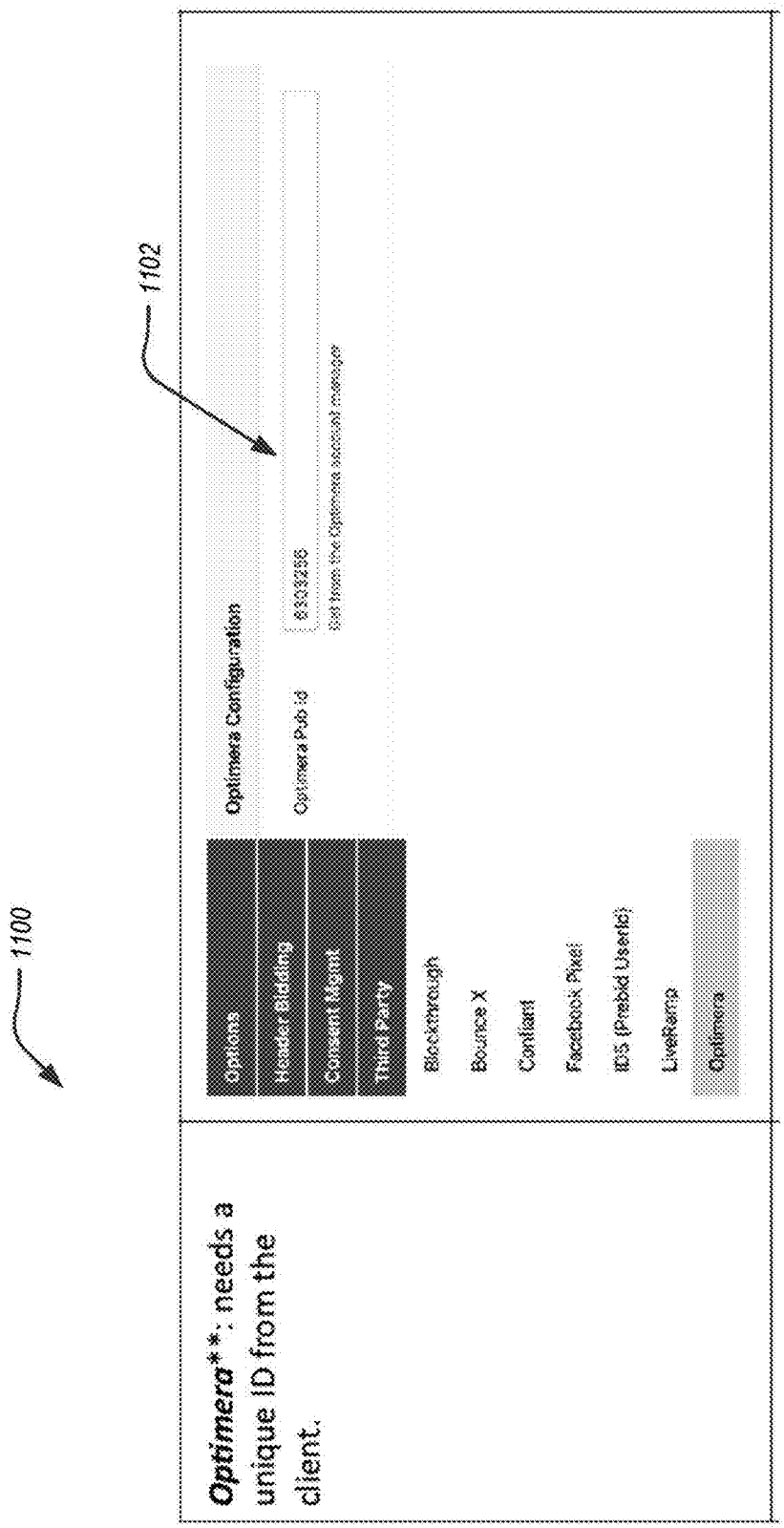
FIG. 11 illustrates a display rendering for data input according to the disclosure.

FIG. 11 illustrates a display rendering for data input according to the disclosure.

In particular, FIG. 11 illustrates a graphical user interface (GUI) 1100 that may include an input portion 1102 for display on a display of the user device 300. With further reference to FIG. 11, the graphical user interface (GUI) 1100 is merely exemplary of a possible layout, possible features, and/or the like. The disclosure contemplates that the graphical user interface (GUI) 1100 may be implemented numerous other ways.

The input portion 1102 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input. In this regard, the input portion 1102 generated by the graphical user interface (GUI) 1100 allows a user to input an Optimera unique ID and/or Optimera publication ID from the user.

Figure 12:
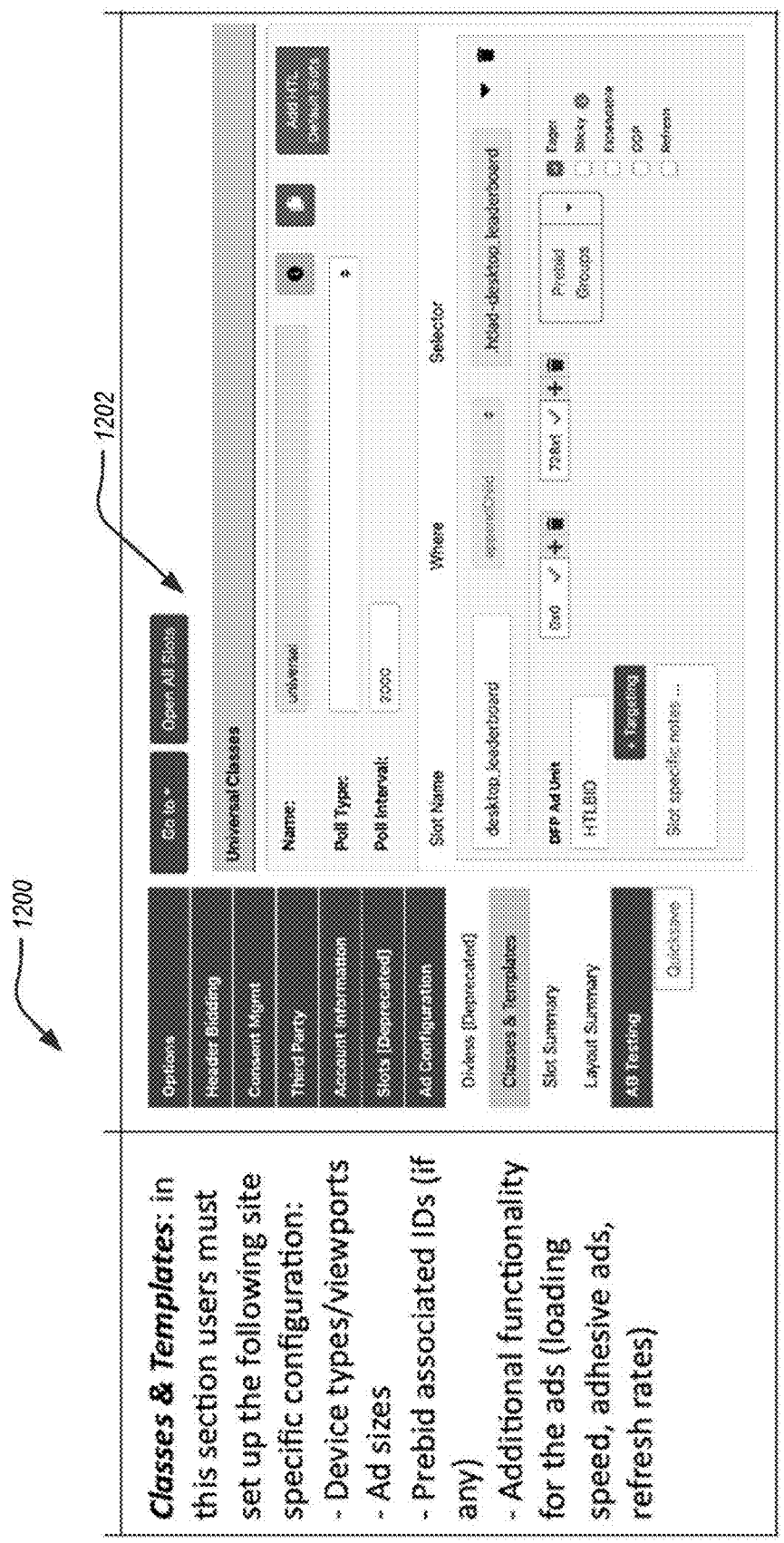
FIG. 12 illustrates a display rendering for data input according to the disclosure.

FIG. 12 illustrates a display rendering for data input according to the disclosure.

In particular, FIG. 12 illustrates a graphical user interface (GUI) 1200 that may include an input portion 1202 for display on a display of the user device 300. With further reference to FIG. 12, the graphical user interface (GUI) 1200 is merely exemplary of a possible layout, possible features, and/or the like. The disclosure contemplates that the graphical user interface (GUI) 1200 may be implemented numerous other ways.

The input portion 1202 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input.

In particular, the input portion 1202 allows a user to input Classes & Templates. For example, the input portion 1202 allows a user to input and set up a site specific configuration. The site specific configuration including one or more of Device types/viewports, Ad sizes, Prebid associated IDs (if any), Additional functionality for the ads (load timings, adhesive ads, refresh rates), and/or the like.

FIG. 13 illustrates a display rendering for data input according to the disclosure.

In particular, FIG. 13 illustrates a graphical user interface (GUI) 1300 that may include an input portion 1302 for display on a display of the user device 300. With further reference to FIG. 13, the graphical user interface (GUI) 1300 is merely exemplary of a possible layout, possible features, and/or the like. The disclosure contemplates that the graphical user interface (GUI) 1300 may be implemented numerous other ways.

The input portion 1302 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input.

In particular, the graphical user interface (GUI) 1300 may be configured to list a history of the revisions, notes related to the revisions, creation dates, usernames associated with modifications, and/or the like. Additionally, the graphical user interface (GUI) 1300 may be configured to provide information on deployment, a status, and/or the like. Further, the input portion 1302 may include the ability to deploy a revision, copy a revision, and/or the like.

Figure 14:
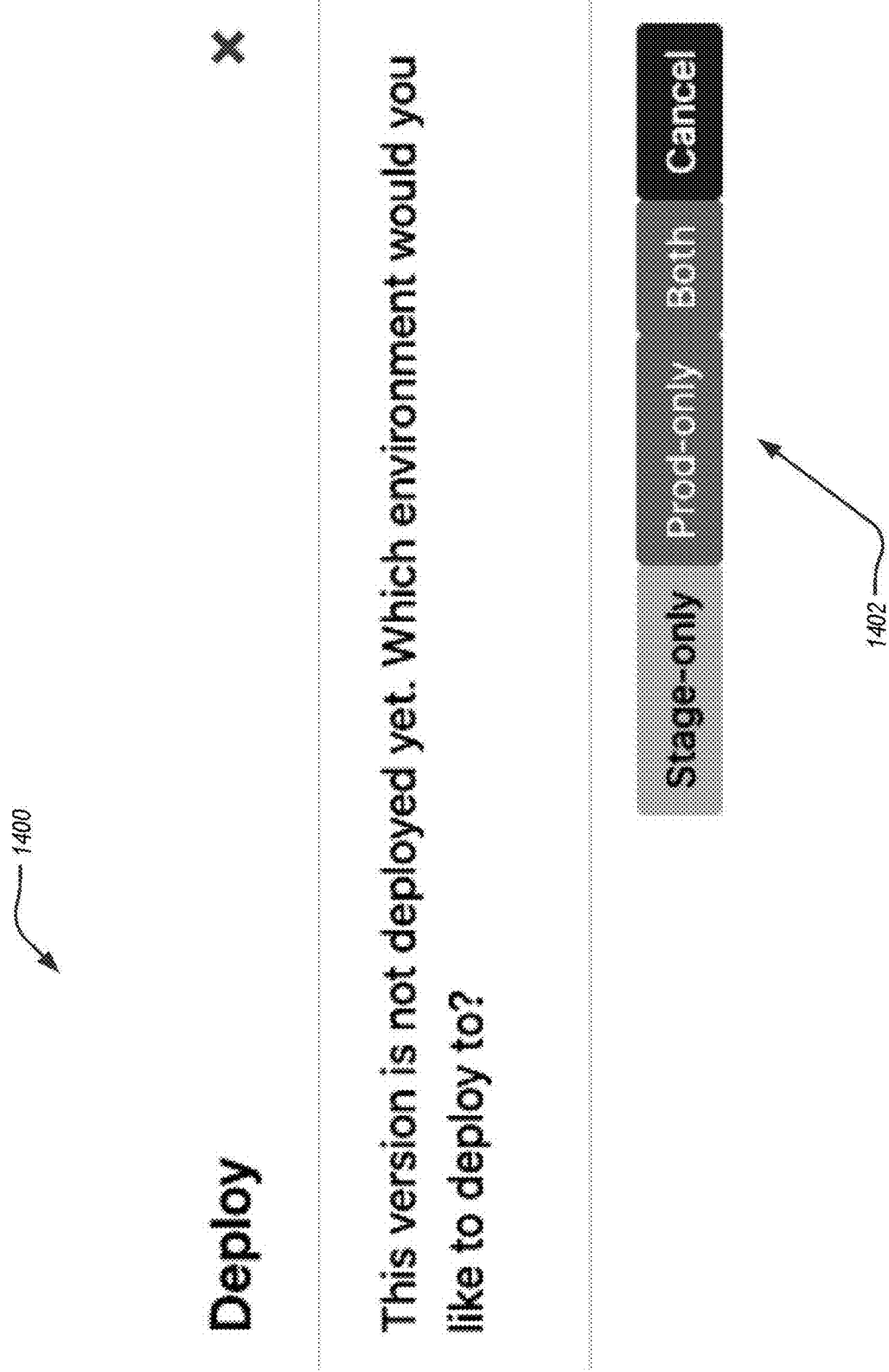
FIG. 14 illustrates a display rendering for data input according to the disclosure.

FIG. 14 illustrates a display rendering for data input according to the disclosure.

In particular, FIG. 14 illustrates a graphical user interface (GUI) 1400 that may include an input portion 1402 for display on a display of the user device 300. With further reference to FIG. 14, the graphical user interface (GUI) 1400 is merely exemplary of a possible layout, possible features, and/or the like. The disclosure contemplates that the graphical user interface (GUI) 1400 may be implemented numerous other ways.

The input portion 1402 may include an input portion to receive keyed in data, data selection by drop-down boxes, data selection by selection from a list, data selection by a drop-down list, data selection by radio buttons, input data by voice recognition, input data by image, input data by machine-readable code, clickable virtual buttons, and/or the like. In one aspect, the keyed in data may automatically populate and/or provide suggested input based on a partial input. In particular, the graphical user interface (GUI) 1400 may include a plurality of the input portion 1402. In this regard, the input portion 1402 may include the ability to deploy an advertising configuration to both stage and production environments, cancel deployment of an advertisement configuration, and/or the like.

Accordingly, the disclosure set forth Accordingly, an advertisement system and/or advertisement process to configure and deploy a wide variety of advertisement technologies across many different websites in an expedited and/or simplified manner without the need to modify code on the webpage.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The following are a number of nonlimiting EXAMPLES of aspects of the disclosure.

One EXAMPLE includes: an advertisement management process that includes providing a user interface with at least one processor to a user device configured to allow a user to configure and deploy a plurality of advertisement technologies across a plurality of websites by generating an advertisement configuration Javascript file without a need to modify a unique advertisement code on the plurality of websites. An advertisement management process that includes where the unique advertisement code is implemented by the plurality of websites. An advertisement management process that includes where the unique advertisement code loads a library associated with the advertisement configuration Javascript file. An advertisement management process that includes where the unique advertisement code calls the advertisement configuration Javascript file. An advertisement management process that includes where the unique advertisement code adds site key-value targeting associated with the advertisement configuration Javascript file.

Other embodiments of this aspect include corresponding computer systems, apparatus, and computer programs recorded on one or more computer storage devices, each configured to perform the actions of the methods.

The above-noted EXAMPLE may further include any one or a combination of more than one of the following EXAMPLES: In aspects the advertisement management process includes providing a user interface with the at least one processor to the user device configured to display configuration settings. In aspects the advertisement management process includes providing a user interface with the at least one processor to the user device configured to display specific website configuration settings. In aspects the advertisement management process includes providing a user interface with the at least one processor to the user device configured to sync with consent management settings. In aspects the advertisement management process includes providing a user interface with the at least one processor to the user device configured to display version identification. In aspects the advertisement management process includes providing a user interface with at least one processor to the user device configured to display targeting settings. In aspects the advertisement management process includes providing a user interface with the at least one processor to the user device configured to set specific advertisement slot configurations. In aspects the advertisement management process includes preparing data with at least one processor for rendering an input display for display on a display of a device that includes a data input portion configured to receive advertisement configuration options. In aspects the advertisement management process where the data input portion at least one of the following where the data input portion includes at least one of the following: keyed in data, data selection by drop-down boxes, data selection by selection from a list, data selection by a drop-down list, data selection by radio buttons, voice recognition input data, image input data, and/or machine-readable code input data. In aspects the advertisement management process includes configuring and deploying a plurality of advertisement technologies across a plurality of websites with the at least one processor in response to user input through a single user interface on the user device. In aspects the advertisement management process includes configuring and deploying a plurality of advertisement technologies across a plurality of websites with the at least one processor without modification of webpage code. In aspects the advertisement management process further includes: compiling individual advertisement configuration Javascript files that configure a plurality of advertisement technologies across a plurality of websites with the at least one processor without modification of webpage code. In aspects the advertisement management process further includes: deploying to production the individual advertisement configuration Javascript files that configure a plurality of advertisement technologies across a plurality of websites with at least one processor without modification of webpage code. In aspects the advertisement management process further includes: deploying to staging sites the individual advertisement configuration Javascript files that configure a plurality of advertisement technologies across a plurality of websites with at least one processor without modification of webpage code. In aspects the advertisement management process where the user device includes an internet enabled device. In aspects the advertisement management process where the internet enabled device at least one of the following where the internet enabled device includes at least one of the following: a personal computer (PC), a laptop, a personal digital assistant (PDA), a tablet computer, a workstation, and/or a smartphone. Implementations of the described techniques may include hardware, a method or process, or a computer tangible medium.

One EXAMPLE includes: an advertisement management process that includes providing advertisement configuration options with at least one processor for display in a user interface on a user device. An advertisement management process that includes receiving selected advertisement configuration options with the at least one processor from the user device. An advertisement management process that includes receiving instructions to save and build an advertisement revision with the at least one processor from the user device based on the selected advertisement configuration options. An advertisement management process that includes compiling and generating a unique advertisement configuration Javascript file with at least one processor based on the selected advertisement configuration options. An advertisement management process that includes storing the unique advertisement configuration Javascript file at a web service provider in response to the at least one processor. An advertisement management process that includes deploying the unique advertisement configuration Javascript file in response to the at least one processor for a webpage without a need to modify a unique advertisement code on a webpage.

Other embodiments of this aspect include corresponding computer systems, apparatus, and computer programs recorded on one or more computer storage devices, each configured to perform the actions of the methods.

The above-noted EXAMPLE may further include any one or a combination of more than one of the following EXAMPLES: In aspects the advertisement management process where the unique advertisement code is implemented by the webpage. In aspects the advertisement management process where the unique advertisement code loads a library associated with the unique advertisement configuration Javascript file. In aspects the advertisement management process where the unique advertisement code calls the unique advertisement configuration Javascript file. In aspects the advertisement management process where the unique advertisement code adds site key-value targeting associated with the unique advertisement configuration Javascript file. In aspects the advertisement management process where the unique advertisement code is implemented by the webpage; where the unique advertisement code loads a library associated with the unique advertisement configuration Javascript file; where the unique advertisement code calls the unique advertisement configuration Javascript file; and where the unique advertisement code adds site key-value targeting associated with the unique advertisement configuration Javascript file. In aspects the advertisement management process includes providing a user interface with the at least one processor to the user device configured to display configuration settings. In aspects the advertisement management process includes providing a user interface with the at least one processor to the user device configured to display specific website configuration settings. In aspects the advertisement management process includes providing a user interface with at least one processor to the user device configured to sync with consent management settings. In aspects the advertisement management process includes providing a user interface with the at least one processor to the user device configured to display version identification. In aspects the advertisement management process includes providing a user interface with the at least one processor to the user device configured to set specific advertisement slot configurations. In aspects the advertisement management process includes providing a user interface with the at least one processor to the user device configured to display targeting settings. In aspects the advertisement management process includes preparing data with at least one processor for rendering an input display for display on a display of a device that includes a data input portion, where the data input portion is configured to receive configuration options. In aspects the advertisement management process where the user interface is configured for data input of advertisement configuration options that at least one of the following where the user interface is configured for data input of advertisement configuration options that includes at least one of the following: keyed in data, data selection by drop-down boxes, data selection by selection from a list, data selection by a drop-down list, data selection by radio buttons, voice recognition input data, image input data, and/or machine-readable code input data. In aspects the advertisement management process includes configuring and deploying a plurality of advertisement technologies across a plurality of websites with at least one processor in response to user input through a single user interface of the user device. In aspects the advertisement management process includes configuring and deploying a plurality of advertisement technologies across a plurality of websites with the at least one processor without modification of webpage code. In aspects the advertisement management process further includes: compiling individual advertisement configuration Javascript files that configure a plurality of advertisement technologies across a plurality of websites with the at least one processor without modification of webpage code. In aspects the advertisement management process further includes: deploying to production the individual advertisement configuration Javascript files that configure a plurality of advertisement technologies across a plurality of websites with the at least one processor without modification of webpage code. In aspects the advertisement management process further includes: deploying to staging sites the individual advertisement configuration Javascript files that configure a plurality of advertisement technologies across a plurality of websites with the at least one processor without modification of webpage code. In aspects the advertisement management process where the user device includes an internet enabled device. In aspects the advertisement management process where the internet enabled device at least one of the following where the internet enabled device includes at least one of the following: a personal computer (PC), a laptop, a personal digital assistant (PDA), a tablet computer, a workstation, and/or a smartphone. Implementations of the described techniques may include hardware, a method or process, or a computer tangible medium.

One EXAMPLE includes: an advertisement management system that includes at least one processor configured to provide a user interface to a user device configured to allow a user to configure and deploy a plurality of advertisement technologies across a plurality of websites by generating an advertisement configuration Javascript file without a need to modify a unique advertisement code on the plurality of websites. An advertisement management system that includes where the unique advertisement code is implemented by the plurality of websites. An advertisement management system that includes where the unique advertisement code loads a library associated with the advertisement configuration Javascript file. An advertisement management system that includes where the unique advertisement code calls the advertisement configuration Javascript file. An advertisement management system that includes where the unique advertisement code adds site key-value targeting associated with the advertisement configuration Javascript file.

Other embodiments of this aspect include corresponding computer systems, apparatus, and computer programs recorded on one or more computer storage devices, each configured to perform the actions of the methods.

One EXAMPLE includes: an advertisement management system that includes at least one processor configured to provide advertisement configuration options for display in a user interface on a user device. An advertisement management system that includes the least one processor configured to receive selected advertisement configuration options from the user device. An advertisement management system that includes the least one processor configured to receive instructions to save and build an advertisement revision from the user device based on the selected advertisement configuration options. An advertisement management system that includes the least one processor configured to compile and generate a unique advertisement configuration Javascript file based on the selected advertisement configuration options. An advertisement management system that includes the least one processor configured to store the unique advertisement configuration Javascript file at a web service provider in response to the at least one processor. An advertisement management system that includes the least one processor configured to deploy the unique advertisement configuration Javascript file in response to the at least one processor for a webpage without a need to modify a unique advertisement code on a webpage.

Other embodiments of this aspect include corresponding computer systems, apparatus, and computer programs recorded on one or more computer storage devices, each configured to perform the actions of the methods.

For the purposes of this disclosure a computer readable medium stores computer data, which data can include computer program code that is executable by a processor in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm, or module may reside as one or any combination or set of codes and/or instructions on a computer readable medium or machine readable medium, which may be incorporated into a computer program product.

The disclosed system, process, and/or device, which may include the user device 300, the advertisement system 400, and/or the like may be configured to utilize communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), 5G (fifth generation), W-CDMA (Wideband Code-Division Multiple Access), Wireless Fidelity (Wi-Fi), Bluetooth, Near field communication (NFC), and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be beneficial due to the ubiquity of web browsers and the convenience of using a web browser as a client (i.e., thin client). Further, with inherent support for cross-platform compatibility, the web application may be maintained and updated without distributing and installing software on each.

The web-based tool may be implemented as a web portal that may be a website that brings information from diverse sources. In some aspects, each information source may generate a dedicated area on the page for displaying information (a portlet). In some aspects, the portal may include mashups and intranet "dashboards." The portal may use an application programming interface (API). The portal may provide a way for enterprises and organizations with access control, modification, procedures, and the like for multiple applications and databases. The features available may be restricted to an authorized and authenticated user (employee, member).

Aspects of the disclosure have been described above with reference to the accompanying drawings, in which aspects of the disclosure are shown. It will be appreciated, however, that this disclosure may, however, be embodied in many different forms and should not be construed as limited to the aspects set forth above. Rather, these aspects are provided so that this disclosure will be thorough and complete, and will fully convey the scope of the disclosure to those skilled in the art. Additionally, the various aspects described may be implemented separately. Moreover, one or more the various aspects described may be combined. Like numbers refer to like elements throughout.

It will be understood that, although the terms first, second, etc. are used throughout this specification to describe various elements, these elements should not be limited by these terms. These terms are only used to distinguish one element from another. For example, a first element could be termed a second element, and, similarly, a second element could be termed a first element, without departing from the scope of the disclosure. The term "and/or" includes any and all combinations of one or more of the associated listed items.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "top" or "bottom" may be used herein to describe a relationship of one element, layer or region to another element, layer or region as illustrated in the figures. It will be understood that these terms are intended to encompass different orientations of the device in addition to the orientation depicted in the figures.

In the drawings and specification, there have been disclosed typical aspects of the disclosure and, although specific terms are employed, they are used in a generic and descriptive sense only and not for purposes of limitation, the scope of the disclosure being set forth in the following claims.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure. In this regard, the various aspects, features, components, elements, modules, arrangements, circuits, and the like are contemplated to be interchangeable, mixed, matched, combined, and the like. In this regard, the different features of the disclosure are modular and can be mixed and matched with each other.

What is claimed is:

1. An advertisement management process comprising:
providing a user interface with at least one processor to a user device configured to allow a user to configure and deploy a plurality of advertisement technologies across a plurality of websites by generating an advertisement configuration file without a need to modify a unique advertisement code on the plurality of websites, the advertisement management process further comprising:
receiving selected advertisement configuration options with the at least one processor from the user device;
receiving instructions to save and build an advertisement revision with the at least one processor from the user device based on the selected advertisement configuration options;
the generating an advertisement configuration file further comprises compiling the advertisement configuration file that configures the plurality of advertisement technologies across the plurality of websites with the at least one processor without modification of a webpage code;
storing the advertisement configuration file at a web service provider in response to the at least one processor; and
deploying the advertisement configuration file in response to the at least one processor for a webpage without a need to modify a unique advertisement code on a webpage,
wherein the unique advertisement code is implemented by the plurality of websites;
wherein the unique advertisement code comprises a script tag that loads a library associated with the advertisement configuration file, calls the advertisement configuration file, and adds any site key-value targeting; and
wherein the advertisement configuration file comprises a programming language that conforms to an ECMAScript standard.

2. The advertisement management process according to claim 1 further comprising providing a user interface with the at least one processor to the user device configured to display configuration settings.

3. The advertisement management process according to claim 1 further comprising providing a user interface with the at least one processor to the user device configured to display specific website configuration settings.

4. The advertisement management process according to claim 1 further comprising providing a user interface with the at least one processor to the user device configured to receive consent management settings and/or data protection settings.

5. The advertisement management process according to claim 1 further comprising providing a user interface with the at least one processor to the user device configured to manage version identification.

6. The advertisement management process according to claim 1 further comprising providing a user interface with the at least one processor to the user device configured to display targeting settings.

7. The advertisement management process according to claim 1 further comprising providing a user interface with the at least one processor to the user device configured to set specific advertisement slot configurations.

8. The advertisement management process according to claim 1 further comprising preparing data with at least one processor for rendering an input display for display on a display of a device that comprises a data input portion configured to receive advertisement configuration options.

9. The advertisement management process according to claim 8 wherein the data input portion comprises at least one of the following: keyed in data, data selection by drop-down boxes, data selection by selection from a list, data selection by a drop-down list, data selection by radio buttons, voice recognition input data, image input data, and/or machine-readable code input data.

10. The advertisement management process according to claim 1 further comprising configuring and deploying a plurality of advertisement technologies across a plurality of websites with the at least one processor in response to user input through a single user interface on the user device.

11. The advertisement management process according to claim 1 further comprising configuring and deploying a plurality of advertisement technologies across a plurality of websites with the at least one processor without modification of webpage code.

12. The advertisement management process according to claim 1 further comprising:
deploying to production a plurality of implementations of the advertisement configuration file as individual advertisement configuration files that configure a plurality of advertisement technologies across a plurality of websites with the at least one processor without modification of webpage code.

13. The advertisement management process according to claim 1 further comprising:
deploying to staging sites a plurality of implementations of the advertisement configuration file as individual advertisement configuration files that configure a plurality of advertisement technologies across a plurality of websites with the at least one processor without modification of webpage code.

14. The advertisement management process according to claim 1 wherein the user device comprises an internet enabled device.

15. The advertisement management process according to claim 14 wherein the internet enabled device comprises at least one of the following: a personal computer (PC), a laptop, a personal digital assistant (PDA), a tablet computer, a workstation, and/or a smartphone.

16. An advertisement management process comprising:
providing advertisement configuration options with at least one processor for display in a user interface on a user device;
receiving selected advertisement configuration options with the at least one processor from the user device;
receiving instructions to save and build an advertisement revision with the at least one processor from the user device based on the selected advertisement configuration options;
compiling and generating a unique advertisement configuration file with the at least one processor based on the selected advertisement configuration options;
storing the unique advertisement configuration file at a web service provider in response to the at least one processor; and
deploying the unique advertisement configuration file in response to the at least one processor for a webpage without a need to modify a unique advertisement code on a webpage,
wherein the unique advertisement code is implemented by a plurality of websites;
wherein the unique advertisement code comprises a script tag that loads a library associated with the unique advertisement configuration file, calls the unique advertisement configuration file, and adds any site key-value targeting; and
wherein the unique advertisement configuration file comprises a programming language that conforms to an ECMAScript standard.

17. An advertisement management system comprising:
at least one processor configured to provide a user interface to a user device configured to allow a user to configure and deploy a plurality of advertisement technologies across a plurality of websites by generating an advertisement configuration file without a need to modify a unique advertisement code on the plurality of websites;
the least one processor configured to receive selected advertisement configuration options from the user device;
the least one processor configured to receive instructions to save and build an advertisement revision from the user device based on the selected advertisement configuration options;
the least one processor configured to compile and generate a unique advertisement configuration file based on the selected advertisement configuration options;
the least one processor configured to store the unique advertisement configuration file at a web service provider in response to the at least one processor; and
the least one processor configured to deploy the unique advertisement configuration file in response to the at least one processor for a webpage without a need to modify a unique advertisement code on a webpage,
wherein the unique advertisement code is implemented by the plurality of websites;
wherein the unique advertisement code comprises a script tag that loads a library associated with the advertisement configuration file, calls the advertisement configuration file, and adds any site key-value targeting; and
wherein the advertisement configuration file comprises a programming language that conforms to an ECMAScript standard.

18. An advertisement management system comprising:
at least one processor configured to provide advertisement configuration options for display in a user interface on a user device;
the least one processor configured to receive selected advertisement configuration options from the user device;
the least one processor configured to receive instructions to save and build an advertisement revision from the user device based on the selected advertisement configuration options;
the least one processor configured to compile and generate a unique advertisement configuration file based on the selected advertisement configuration options;
the least one processor configured to store the unique advertisement configuration file at a web service provider in response to the at least one processor; and
the least one processor configured to deploy the unique advertisement configuration file in response to the at least one processor for a webpage without a need to modify a unique advertisement code on a webpage,
wherein the unique advertisement code is implemented by a plurality of websites;
wherein the unique advertisement code comprises a script tag that loads a library associated with the unique advertisement configuration file, calls the unique advertisement configuration file, and adds any site key-value targeting; and
wherein the unique advertisement configuration file comprises a programming language that conforms to an ECMAScript standard.

* * * * *